(12) United States Patent
Thor

(10) Patent No.: US 8,744,705 B2
(45) Date of Patent: Jun. 3, 2014

(54) SYSTEM AND METHOD FOR DETERMINING CLUTCH GAINS IN A TRANSMISSION DURING A POWER DOWNSHIFT

(75) Inventor: Todd J. Thor, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 13/420,673

(22) Filed: Mar. 15, 2012

(65) Prior Publication Data

US 2013/0245904 A1  Sep. 19, 2013

(51) Int. Cl.
*B60W 10/02* (2006.01)
*B60W 10/11* (2012.01)

(52) U.S. Cl.
USPC ............................... 701/55; 192/3.61

(58) Field of Classification Search
USPC .................. 701/51, 52, 55, 57; 477/86, 89, 477/127–135, 143–149; 192/3.51
See application file for complete search history.

(56) References Cited

U.S. PATENT DOCUMENTS

| | | | | |
|---|---|---|---|---|
| 4,790,418 A * | 12/1988 | Brown et al. | ................... | 701/51 |
| 4,829,433 A * | 5/1989 | Nakano et al. | .................. | 701/51 |
| 4,935,872 A * | 6/1990 | Benford et al. | .................. | 701/51 |
| 4,936,167 A * | 6/1990 | Mehta | ............................ | 477/155 |
| 4,968,999 A * | 11/1990 | Fodale et al. | .................... | 701/54 |
| 4,991,097 A * | 2/1991 | Fodale et al. | .................. | 701/105 |
| 5,020,391 A * | 6/1991 | Aoki et al. | ..................... | 477/143 |
| 5,070,746 A * | 12/1991 | Milunas et al. | ............... | 477/154 |
| 5,070,747 A * | 12/1991 | Lentz et al. | .................... | 477/149 |
| 5,079,970 A * | 1/1992 | Butts et al. | .................... | 477/102 |
| 5,123,302 A * | 6/1992 | Brown et al. | .................. | 477/154 |
| 5,342,258 A * | 8/1994 | Egyed | ............................ | 475/281 |
| 5,842,951 A * | 12/1998 | Yasue et al. | ..................... | 477/149 |
| 5,938,712 A * | 8/1999 | Ibamoto et al. | .................. | 701/54 |
| 5,947,864 A * | 9/1999 | Ohashi et al. | ................... | 477/154 |
| 5,951,614 A * | 9/1999 | Tabata et al. | .................... | 701/54 |
| 5,951,615 A * | 9/1999 | Malson | .......................... | 701/57 |
| 6,009,768 A * | 1/2000 | Hoshiya et al. | ............. | 74/336 R |
| 6,068,575 A * | 5/2000 | Tanizawa et al. | ............. | 477/144 |
| 6,102,825 A * | 8/2000 | Hisano et al. | ................. | 475/118 |
| 6,277,051 B1 * | 8/2001 | Yeo | ............................... | 477/149 |
| 6,385,520 B1 * | 5/2002 | Jain et al. | ......................... | 701/51 |
| 6,468,182 B1 * | 10/2002 | Brandt et al. | .................... | 477/98 |
| 6,780,140 B2 * | 8/2004 | Okamoto et al. | ................ | 477/62 |
| 7,211,028 B2 * | 5/2007 | Matsumura | ................... | 477/124 |
| 7,216,025 B2 * | 5/2007 | Keyse et al. | ..................... | 701/61 |
| 7,421,326 B2 * | 9/2008 | Thor et al. | ........................ | 701/67 |
| 7,563,196 B2 * | 7/2009 | Yamada et al. | ............... | 477/110 |
| 7,608,013 B2 * | 10/2009 | Chen | ............................ | 477/132 |

(Continued)

*Primary Examiner* — Fadey Jabr
*Assistant Examiner* — Allen E Quillen
(74) *Attorney, Agent, or Firm* — Quinn Law Group, PLLC

(57) ABSTRACT

A method of controlling an offgoing clutch in a transmission during a power downshift includes detecting the downshift, reducing a pressure command to the offgoing clutch, and introducing a calibrated error value to a pressure command for the offgoing clutch during the inertia phase. The method also includes synchronizing the speed of the offgoing and an oncoming clutch during the torque phase, determining the offgoing clutch pressure and torque after synchronizing clutch speeds, and then recording a clutch gain as a function of the offgoing clutch pressure and torque. The recorded clutch gains are used to control a subsequent power downshift of the transmission. A controller using proportional-integral-derivative (PID) control logic introduces the error as PID error in a pressure control signal, and controls slip across the offgoing clutch. A transmission is also disclosed having an offgoing clutch and controller configured to execute the above method.

9 Claims, 3 Drawing Sheets

(56) References Cited

U.S. PATENT DOCUMENTS

| | | | |
|---|---|---|---|
| 7,620,407 B1 * | 11/2009 | Donald et al. | 455/466 |
| 7,620,487 B2 * | 11/2009 | Shimada et al. | 701/60 |
| 7,630,812 B2 * | 12/2009 | Jiang et al. | 701/68 |
| 7,713,167 B2 * | 5/2010 | Yamamoto et al. | 477/98 |
| 7,933,706 B2 * | 4/2011 | Ikeda et al. | 701/62 |
| 8,065,064 B2 * | 11/2011 | Ikeda et al. | 701/51 |
| 8,079,935 B2 * | 12/2011 | Matsuo et al. | 477/98 |
| 8,175,779 B2 * | 5/2012 | Sawada et al. | 701/54 |
| 8,251,194 B2 * | 8/2012 | Fujii et al. | 192/3.58 |
| 8,370,036 B2 * | 2/2013 | Ikeda et al. | 701/62 |
| 8,483,919 B2 * | 7/2013 | Byerly et al. | 701/60 |
| 2004/0172184 A1 * | 9/2004 | Vukovich et al. | 701/51 |
| 2006/0089775 A1 * | 4/2006 | Whitton et al. | 701/51 |
| 2008/0146407 A1 * | 6/2008 | Tuckfield | 477/34 |
| 2010/0318269 A1 * | 12/2010 | Yanakiev et al. | 701/55 |
| 2012/0089307 A1 * | 4/2012 | Hyodo et al. | 701/52 |
| 2012/0330521 A1 * | 12/2012 | Harada | 701/56 |

* cited by examiner

SYSTEM AND METHOD FOR DETERMINING CLUTCH GAINS IN A TRANSMISSION DURING A POWER DOWNSHIFT

TECHNICAL FIELD

The present disclosure relates to a system and a method for determining transmission clutch gain values during a power downshift of the transmission.

BACKGROUND

An automatic transmission includes gear elements and clutches that selectively couple input and output shafts of the transmission to establish a desired output speed ratio. Clutch engagement is typically achieved via a controlled application of fluid pressure. The applied fluid pressure moves a clutch piston from an initial position into engagement with a clutch pack. Shifting from one speed ratio to another is performed automatically by a transmission controller. The controller releases a clutch associated with the current speed ratio, i.e., the offgoing clutch, and applies a clutch associated with a desired new speed ratio, i.e., the oncoming clutch. Precise knowledge of various control values of the oncoming and offgoing clutches is essential to control and optimize feel of the shift event.

SUMMARY

A method and system are disclosed herein for accurately determining clutch gains of an offgoing clutch during a power downshift in a transmission. Use of the present control approach may help to improve the robustness of shift control. It is recognized herein that dynamic clutch gains, e.g., $$\frac{\text{pressure}}{\text{torque}},$$

can fade during a power downshift. That is, as shift energy increases during a downshift there is a point at which more clutch pressure is required to develop the same clutch torque. The present approach may help solve this particular problem.

A controller may be used to execute the present method. The controller includes proportional-integral-derivative (PID) control logic that is used to control the synchronization speed for the downshift. Once speed synchronization has been maintained for a short calibrated duration, i.e., sync has sufficiently stabilized, the clutch torque/pressure relationship may be measured. The clutch gain is calculated from these measured values.

For instance, an example power downshift executed near a closed-throttle downshift line may see turbine speed rise of only 700 RPM. Sync here could require 100 nm of clutch torque. If return spring pressure (previously learned) is 75 kpa, this particular shift has a gain (K) for the offgoing clutch of 2.0, i.e., (275−75)/100=2.0. Another downshift executed at a higher speed and torque, i.e., a higher energy downshift, may see a much greater turbine speed rise of 1300 RPM, with synchronization requiring 200 nm of clutch torque. With the return spring still at 75 kpa, the gain (K) is now (525−75)/200 or 2.25 for this shift, which is performed at significantly higher energy levels than the first example. These gains (K) are learned according to the present approach.

The calculated clutch gains (K) can be saved to a storage array. The storage array may be, by way of example, a [1×X] lookup table populated as a function of calculated shift energy. Alternatively, the storage array may be a [Y×X] table populated as a function of the offgoing clutch torque and slip speed, both of which may be separately averaged over the torque phase of the shift. As is well understood in the art, the term "torque phase" refers to the phase of a shift in which torque carried by the offgoing clutch transitions to the oncoming clutch. Offgoing clutch torque decreases throughout the torque phase until the offgoing clutch begins to freewheel. In the inertia/speed phase of the same shift, engine speed is controlled to a post-shift target speed and the transmission output torque rises in a manner that depends on the transmission input torque and the oncoming clutch pressure.

In particular, a method of controlling an offgoing clutch in an automatic transmission during a power downshift includes detecting initiation of the downshift and reducing a pressure command to the offgoing clutch to a threshold level. The method also includes introducing a calibrated error value to a pressure control command for the offgoing clutch during the inertia phase of the downshift, and synchronizing the offgoing clutch speed with an oncoming clutch speed during the torque phase of the downshift. The offgoing clutch pressure and torque are determined after a calibrated duration of the synchronizing of the clutch speeds. The method then includes recording a clutch gain as a function of the offgoing clutch pressure and the offgoing clutch torque and using the recorded clutch gain to control a subsequent power downshift of the transmission.

The controller may use PID control logic to introduce the error and to control synchronization of clutch speed. The gains may be recorded in a lookup table, for instance a [1×X] table indexed by shift energy or a [Y×X] table indexed by torque and slip of the offgoing clutch.

An automatic transmission includes a clutch that is used as an offgoing clutch during a downshift, and a controller in communication with the clutch. The controller includes proportional-integral-derivative (PID) control logic, and is configured to execute the above method steps.

The above features and advantages and other features and advantages of the present invention are readily apparent from the following detailed description of the best modes for carrying out the invention when taken in connection with the accompanying drawings.

DETAILED DESCRIPTION

Figure 3:
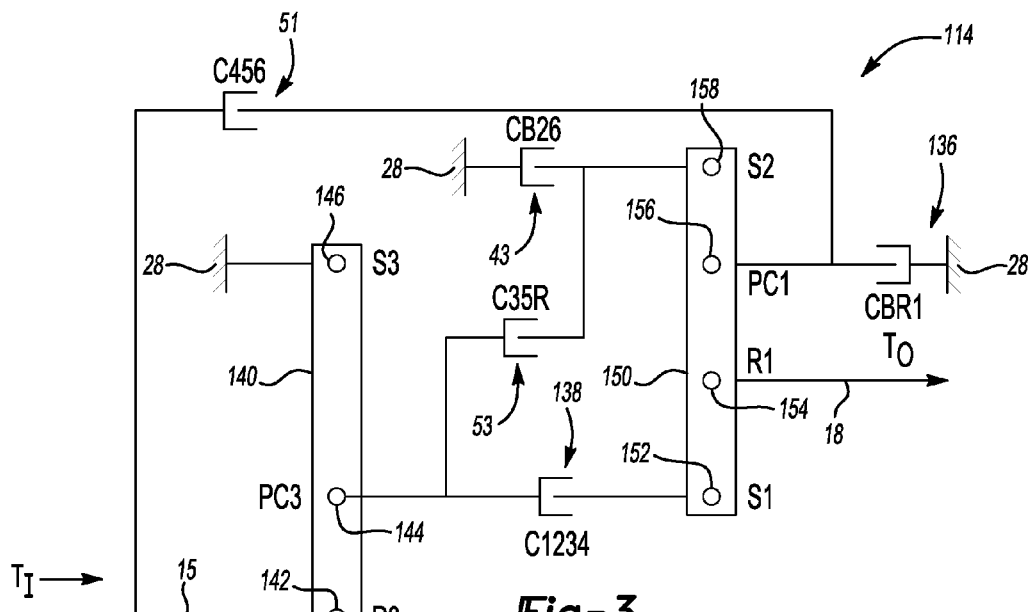
FIG. 3 is an example lever diagram for another transmission whose clutch gain values may be determined according to the present approach.
Figure 4:
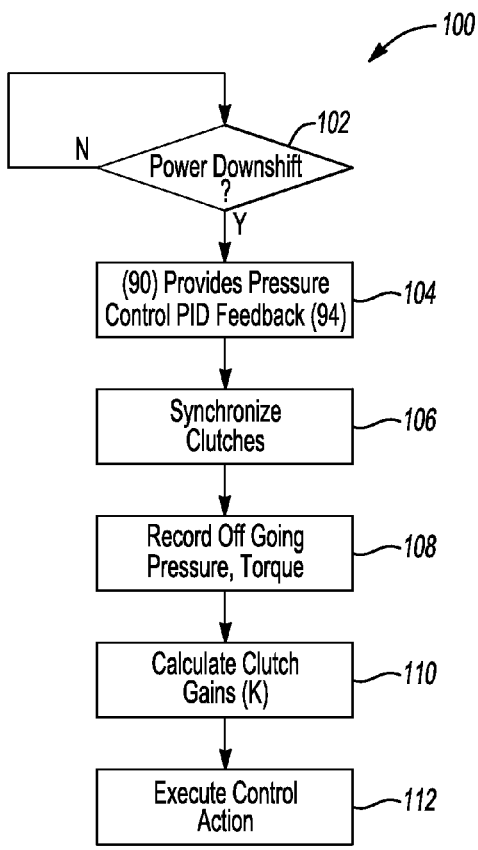
FIG. 4 is a flow chart describing an example embodiment of the present method.

Referring to the drawings, wherein like reference numbers correspond to like or similar components throughout the several figures, and beginning with FIG. 1, a vehicle 10 includes a controller 26, e.g., a transmission control unit, which selectively executes the present method 100, an example of which is shown in FIG. 4 and described in detail below. Execution of the present method 100 by the controller 26 enables the controller 26 to precisely determine clutch gains of an offgoing clutch during a power downshift. The gains may be recorded in a lookup table and used to control a subsequent shift. The lookup table may be alternatively embodied as a [1×X] table indexed by calculated shift energy as set forth below, or as a [Y×X] table indexed by offgoing clutch torque and slip speed. Example offgoing clutches usable with the present method 100 are described in detail below with reference to FIGS. 2 and 3.

Figure 1:
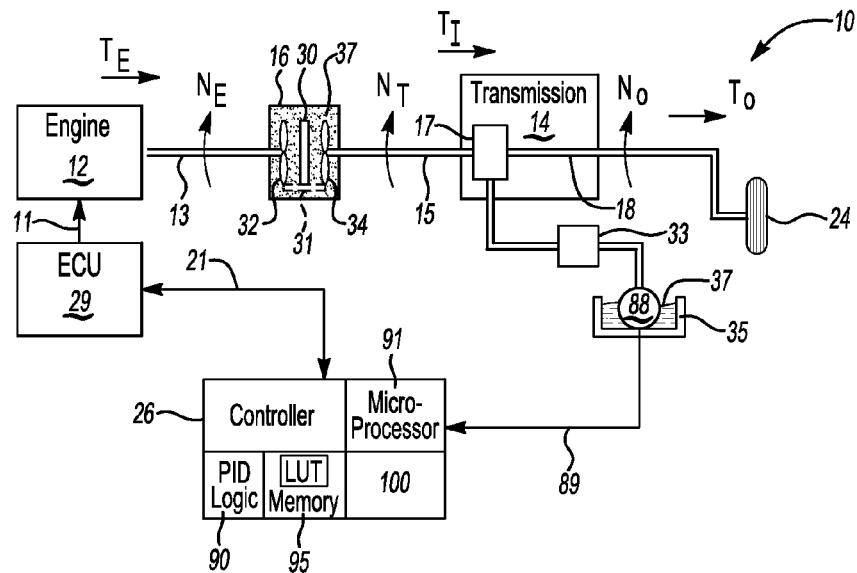
FIG. 1 is a schematic illustration of a vehicle having an automatic transmission and a controller which executes the present method for determining clutch gains during a power downshift.

The vehicle 10 of FIG. 1 includes an internal combustion engine 12. The engine 12 is coupled to an automatic transmission 14 via a hydrodynamic torque converter 16. The engine 12 delivers engine torque (arrow $T_E$) via an engine shaft 13 which rotates at engine speed (arrow $N_E$). The transmission 14 includes a transmission input shaft 15 which rotates at an input speed (arrow $N_T$). Transfer of input torque (arrow $T_I$) to the transmission 14 occurs through the torque converter 16, as is well understood in the art and as described below.

The transmission 14 of FIG. 1 also has an output shaft 18. The output shaft 18 ultimately conveys a transmission output torque (arrow $T_O$) transmitted from various clutch and gear sets 17 of the transmission 14. The transmission output torque (arrow $T_O$) is ultimately delivered to a set of drive wheels 24. The clutch and gear sets 17 can be selectively actuated via electro-hydraulic controls (not shown) powered by fluid that is delivered under pressure from a fluid pump 33 that is configured to draw fluid 37 from a transmission sump 35. A temperature sensor 88 may be positioned within the fluid 37 and configured to measure a transmission fluid temperature (arrow 89), and to transmit the same to the controller 26 for execution of portions of the present method 100.

The example transmission 14 of FIG. 1 may be configured as any multi-speed transmission. Two example transmissions are provided herein as an 8-speed transmission 14 (FIG. 2) and a 6-speed transmission 114 (FIG. 3). In a power downshift, the particular rotating and/or braking clutches of the transmissions 14 and 114 described herein that are used as the offgoing and oncoming clutches will vary depending on the starting and ending gear states of the downshift.

The controller 26 may be configured as a microprocessor-based device having such common elements as a microprocessor 91 or CPU, and/or read only memory (ROM), random access memory (RAM), electrically-programmable read-only memory (EPROM), etc., some of which may be designated as the memory 95 noted above. The controller 26 also includes logic circuitry including but not limited to proportional-integral-derivative (PID) control logic 90, a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry.

The controller 26 uses proportional-integral-derivative (PID) control logic 90 to execute the present method 100. As is well understood in the art, PID control uses three feedback terms: a proportion (P) term, an integral (I) term, and a derivative (D) term. Each term represents the respective present, past, and future error values. The control logic responsible for generating the I term is generally referred to as an integrator. A controller using PID control logic, e.g., the present controller 26, calculates an error value in a given process variable as a difference between a measured value and a desired/calibrated value and thereafter controls process inputs as a function of the three control terms.

Still referring to FIG. 1, an engine control unit (ECU) 29 may be used either as a separate device as shown or integrated with the controller 26. If separate, the controller 26 may be in communication with the ECU 29 as indicated by double-headed arrow 21. The controller 26 may request a specific level of managed engine torque (arrow 11) from the ECU 29 as needed, and may receive any engine control values the controller 26 might require in the execution of method 100, e.g., engine speed, engine torque, and/or any other modeled engine control values.

The torque converter 16 shown in FIG. 1 has a stator 30 positioned between a pump 32 and a turbine 34. A torque converter clutch 31 may also be used to selectively lock the pump 32 to the turbine 34 above a threshold lockup speed, as will be understood by those of ordinary skill in the art. The pump 32 may be coupled to the output shaft 13 to thereby rotate at engine speed (arrow $N_E$). Within the torque converter 16, the turbine 34 is driven by fluid 37, with the turbine 34 in turn connected to the input shaft 15 of the transmission 14. Thus, rotation of the turbine 34 ultimately rotates the input shaft 15 at a turbine speed, which is the same as the input speed (arrow $N_T$) noted above. Viscous drag or friction losses within the transmission 14 tending to reduce the turbine speed (arrow $N_T$) to a level somewhat less than engine speed (arrow $N_E$), as will be readily understood by those of ordinary skill in the art.

Figure 2:
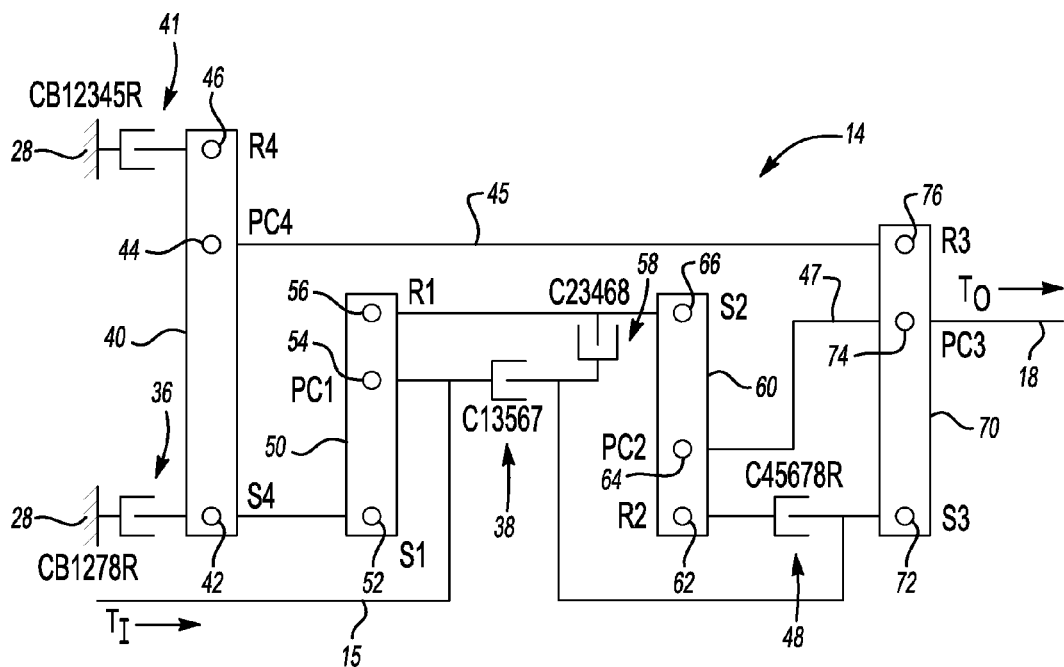
FIG. 2 is an example lever diagram for a transmission whose clutch gain values may be determined according to the present approach.

FIGS. 2 and 3 illustrate two possible transmissions 14 and 114, respectively that may be controlled using the present method 100. Transmission 14 of FIG. 2 is an 8-speed transmission having four planetary gear sets 40, 50, 60, and 70. Transmission 114 of FIG. 3 is a 6-speed transmission having two planetary gear sets 140 and 150. Other transmissions capable of executing a power-on downshift may be readily envisioned, and therefore the transmissions 14 and 114 are not intended to be limiting.

Referring to FIG. 2, the example transmission 14 may include a braking clutch CB1278R, i.e., clutch 36. The nomenclature CB1278R represents that this particular device is a braking clutch (CB), and is engaged in each of $1^{st}$, $2^{nd}$, $7^{th}$, $8^{th}$, and reverse (R) gears. The transmission 14 also includes another braking clutch CB12345R, or clutch 41, which selectively connects an element of a first gear set 40 to a stationary member 28 when engaged. Clutches 36 and 41 are connected to respective nodes 42 and 46 of first gear set 40. In one embodiment, node 42 can be a sun gear (S4) of the gear set 40, while node 46 may be a ring gear (R4) of the same gear set. Gear set 40 also includes a node 44, which may be a carrier member (PC4) in the embodiment shown.

Node 42 is also connected to a node 52 of a second gear set 50. Node 54 of gear set 50 is connected to an input side of a rotating clutch C13567, i.e., clutch 38, as is the transmission input shaft 15 with input torque (arrow $T_I$). Node 56 is connected to a third gear set 60 as explained below. In one embodiment, gear set 50 may be a planetary gear set wherein nodes 52, 54, and 56 are a sun gear (S1), a carrier member (PC1), and a ring gear (R1), respectively.

The third gear set 60 includes nodes 62, 64, and 66, which in one embodiment may be ring gear (R2), carrier member (PC2), and sun gear (S2), respectively. A rotating clutch C23468, i.e., clutch 58, may be connected between the output of clutch 38 and node 66, and between node 56 of gear set 50 and node 66 of gear set 60. Node 62 may be connected to a fourth gear set 70 having nodes 72, 74, and 76. Nodes 72, 74, and 76 may be a sun gear (S3), carrier member (PC3) and ring gear (R3), respectively. In particular, node 62 may be connected to node 72 via a rotating clutch C45678R, i.e., clutch 48. Node 64 of gear set 60 may be directly connected to node 74 of gear set 70, which in turn may be connected to the transmission output shaft 18 (also see FIG. 1). The particular clutch designated as the offgoing clutch in a given downshift maneuver of the 8-speed transmission 14 will vary with the start and end states as noted above.

Referring to FIG. 3, the transmission 14 of FIG. 1 may be embodied as a 6-speed transmission 114. In this embodiment, the transmission input shaft 15 may be connected to a first gear set 140 having nodes 142, 144, and 146, which may be embodied as a ring gear (R3), carrier member (PC3), and sun gear (S3) as shown. The input shaft 15 may be directly connected to node 142, and to a clutch C456, i.e., clutch 51. Node 144 is connected to a clutch C1234, i.e., the clutch 138, and to an input side of a rotating clutch C35R, i.e., clutch 53. Node 146 is grounded to the stationary member 28.

A second gear set 150 includes nodes 152, 154, 156, and 158, which may be embodied as a sun gear (S1), ring gear (R1), carrier gear (PC1), and another sun gear (S2), respectively. Node 158 is selectively connected to the stationary member 28 via a braking clutch CB26, i.e., clutch 43. Node 154 is directly connected to the transmission output shaft 18. Node 156 is connected to a braking clutch CBR1, i.e., clutch 136, which is also connected to a stationary member 28. As with the 8-speed transmission 14 of FIG. 2, the particular clutch designated as the offgoing clutch in a given downshift maneuver of the 6-speed transmission 114 will vary with the start and end states as noted above.

Figure 5:
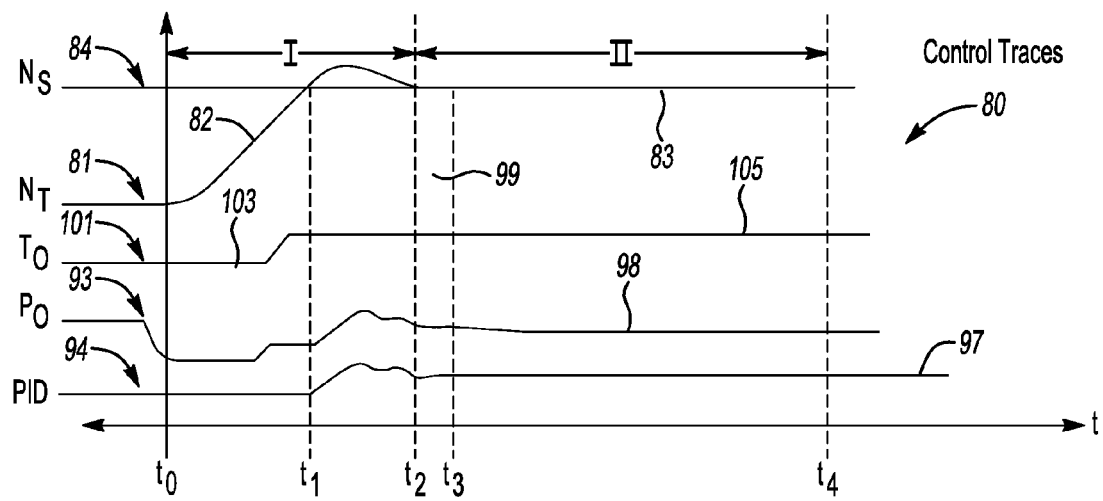
FIG. 5 is a set of traces describing various clutch control values used during execution of the present method.

Referring to FIG. 4 in conjunction with the shift control traces 80 FIG. 5, an example embodiment of the present method 100 commences at step 102. In this initial step, the controller 26 of FIG. 1 determines whether a power downshift has been commanded and is actively proceeding. This may be determined from various values such as engine speed (arrow $N_E$ of FIG. 1) or turbine speed (arrow $N_T$), transmission gear state, shift lever position, etc. The method 100 only progresses during a downshift, and therefore step 102 is repeated until conditions are present that are indicative of a power downshift.

Upon detection of a requested power downshift at step 102, and before onset of the inertia phase of the shift, the controller 26 of FIG. 1 reduces an offgoing pressure (trace 93 of FIG. 5) to the offgoing clutch to a calibrated pressure, e.g., a pressure value determined from a previously-learned clutch torque/pressure relationship for the offgoing clutch. Trace 93 is also labeled $P_O$ in FIG. 5, i.e., "offgoing pressure", for added clarity. As is well understood in the art, a clutch pressure command (P) may be determined as a function of transmission input torque ($T_I$ of FIG. 1) and a calibrated clutch gain K, i.e., $P=f(T_I\cdot K)$. For instance, K may equal $$\frac{P_o}{T_o},$$

where $T_0$ (offgoing torque, or trace 101) is derived by the controller 26. The gain K can be learned and updated with every downshift using the present method 100, thus improving the quality of the shift control over time.

During a downshift, the offgoing clutch is quickly emptied according to the profile of the offgoing pressure (trace 93). The profile of this commanded drop in pressure may be determined via calibration. In step 102, when a downshift is initiated at time $t_0$, turbine speed (trace 81), which is also abbreviated as $N_T$ in FIG. 5, quickly rises during the inertia phase (phase I) as indicated by region 82. At the same time, offgoing pressure (trace 93) drops according to a calibrated profile. Offgoing torque (trace 101) is initially slipping (flat region 103), begins to ramp up during the inertia phase (phase I) as shown, then levels off (flat region 105) during the torque phase (phase II) which commences at $t_2$.

Turbine speed (trace 81) flattens out in region 83 after $t_2$ for the duration of the torque phase (phase II), extending to $t_4$ or beyond depending on whether/when another shift is commanded. A calibrated stability verification interval 99 is defined between $t_2$ and $t_3$, where $t_2$ is a point in time when turbine speed (trace 81) and the synchronization speed $N_S$ (trace 84) for the next gear are synchronized and thus equal. Turbine speed stability is checked in this range by the controller 26 of FIG. 1. The method 100 progresses when turbine speed (trace 81) is stable, i.e., no longer changing.

At step 104, the PID logic 90 of the controller 26 shown in FIG. 1 provides pressure control PID feedback (trace 94) of the offgoing clutch after $t_2$. This occurs just before transition to the torque phase (phase II). Offgoing clutch pressure (trace 93) rises before $t_1$ from the feed forward coming from the rise in output torque $t_0$ (trace 101), and thereafter stabilize as indicated by flat region 98. The corresponding region of the pressure control PID feedback (trace 94) is flat region 97. Over time, i.e., with multiple iterations of the present method 100, the pressure corresponding to region 98 may approach the level of pressure before $t_0$ when offgoing clutch pressure (trace 93) is initially dropped.

At step 106, the controller 26 of FIG. 1 synchronizes the rotational speeds of the offgoing and oncoming clutches, and waits a calibrated duration ($t_3$-$t_2$). After $t_3$, the offgoing clutch pressure (trace 93) stabilizes in region 98 as noted above. Offgoing torque (trace 101) levels off in region 105, i.e., holding torque. Over time and with multiple learning cycles, region 98 may approximate or equal the level of the offgoing pressure (trace 93) as it appears before initiation of the shift at $t_0$. Initially, however, these values may differ from each other.

During the initial part of synchronization in step 106, the oncoming clutch for the new gear state remains disengaged. The synchronization point is thus held solely by the feed forward value and pressure control PID feedback (trace 94) for the offgoing clutch. That is, the oncoming clutch is kept disengaged until the PID control logic 90 as used for control of the offgoing clutch, along with the offgoing feed forward terms (gain and previously-learned return spring pressure for the offgoing clutch), have maintained synchronization for a calibrated duration, i.e., the stability verification interval 99. The method 100 then proceeds to step 108.

At step 108, after $t_3$ when turbine speed is stable as noted above, the controller 26 of FIG. 1 records the offgoing pressure and the offgoing torque. The former may be measured directly, e.g., via a pressure transducer or other means. The latter may be calculated and averaged over time, for instance over a portion of the torque phase (phase II). As is known in the art, clutch torque may be derived from the input torque used in an engine torque model, e.g., a value available from the engine control unit 29 of FIG. 1, and the original or starting gear ratio i.e., 6th gear in an example downshift from $6^{th}$ gear to $5^{th}$ gear. While not shown in FIG. 5 for simplicity, as synchronization approaches in a downshift, the clutch torque on the offgoing clutch increases until it is sufficient for holding all of the input torque.

At step 110, the required clutch gains (K) noted above are calculated at $t_3$ from the recorded torque/pressure relationship of step 108. In one possible embodiment, step 110 may entail recording the gains (K) in a [1×X] table indexed by calculated shift energy. The controller 26 may calculate the shift energy as a function of clutch slip and clutch torque over the inertia phase (phase I) of the shift.

The following example formula may be used to calculate shift energy ($E_{SHIFT}$):

$$E_{SHIFT} = \int(\text{SLIP} * 0.10472(\text{rad/sec/rpm}) \cdot T_{OFF}(\text{ftlb}) \cdot \text{loop rate(sec)})$$

where SLIP=the slip rate of the offgoing clutch during the duration of the shift, $T_{OFF}$ is the offgoing torque averaged during the torque phase (phase I), and loop rate is the control loop cycle frequency, with the above product integrated over the duration of the shift. At the end of the shift, the shift energy ($E_{SHIFT}$) can be filtered down to zero by a calibrated rate as a function of transmission fluid temperature.

With respect to the filtering step noted immediately above, as the clutches are typically wet clutches that are bathed in transmission oil, e.g., the fluid 37 of FIG. 1, the accumulated energy in a given clutch will tend to decrease rather quickly to its normal starting state, e.g., within about 10 to 20 seconds or less of a shift. A shift is rarely repeated exactly in quick succession. To simplify the return to a starting state, a coefficient can be calculated as a function of measured transmission fluid temperature. Thus, the temperature sensor 88 of FIG. 1 may measure and record this temperature and relay it to the controller 26 as a temperature signal (arrow 89). The coefficient could be multiplied by the energy remaining and subtracted at the completion of each control loop until the energy returns to zero.

In another embodiment, the table may be a [Y×X] table which is a function of offgoing clutch torque, averaged over the torque phase, and the offgoing clutch slip, also averaged over the torque phase. Once populated, gain values can be extracted from either table embodiment during the shift to improve the speed and robustness of the shift controls used to execute the downshift.

At step 112, a control action can be executed using the recorded values, such as but not limited to execution of a subsequent shift event using the recorded values. That is, the controller 26 may quickly reference one or both tables, depending on the embodiment, extract the recorded gain (K), and use this gain value to control the transmission 14. One may use just one of the tables noted above with reference to step 110. However, other possibilities exist in which both tables may be used in combination. For instance, one may average the gains that are extracted from the two tables, equally or unequally weighting the values depending on the embodiment.

While the best modes for carrying out the invention have been described in detail, those familiar with the art to which this invention relates will recognize various alternative designs and embodiments for practicing the invention within the scope of the appended claims.

The invention claimed is:

1. A method of controlling an offgoing clutch in an automatic transmission during a power downshift of a vehicle having a controller, the method comprising:
    detecting initiation of the power downshift;
    reducing a pressure command to the offgoing clutch to a threshold level via the controller;
    introducing a calibrated error value to a pressure control command for the offgoing clutch via the controller during the inertia phase of the power downshift;
    calculating a shift energy value of the power downshift only over the inertia phase of the power downshift;
    synchronizing a speed of the offgoing clutch with a speed of an oncoming clutch speed during the torque phase of the power downshift;
    determining a pressure and a clutch torque of the offgoing clutch after a calibrated duration of the synchronizing of the clutch speeds;
    calculating a clutch gain as a function of the offgoing clutch pressure and the offgoing clutch torque;
    recording the calculated clutch gain in a lookup table that is indexed by the calculated shift energy value; and
    controlling a subsequent power downshift of the transmission using the recorded clutch gain.

2. The method of claim 1, further comprising:
    recording the clutch gain in a [1×X] lookup table indexed by the calculated shift energy value.

3. The method of claim 1, wherein introducing a calibrated error value to a pressure control command for the offgoing clutch is conducted using proportional-integral-derivative (PID) control logic of the controller.

4. A method of controlling an offgoing clutch of an automatic transmission during a power downshift in a vehicle having a transmission shift controller, the method comprising:
    detecting initiation of the power downshift;
    reducing a pressure command to the offgoing clutch to a threshold level via the transmission shift controller;
    introducing a calibrated error value to a pressure control command for the offgoing clutch via proportional-integral-derivative (PID) control logic of the transmission shift controller during the inertia phase of the power downshift;
    synchronizing the offgoing clutch speed with the oncoming clutch speed during the torque phase of the power downshift;
    waiting a calibrated duration after synchronizing the offgoing and oncoming clutch speeds;
    determining a clutch torque of the offgoing clutch after the calibrated duration has elapsed;
    measuring a slip speed of the offgoing clutch;
    calculating, only during the inertia phase of the power downshift a shift energy value of the power downshift as a function of the measured slip speed and the clutch torque of the offgoing clutch;
    recording a clutch gain in a [1×X] lookup table indexed by the calculated shift energy value; and
    controlling a subsequent power downshift of the transmission using the recorded clutch gain.

5. The method of claim 4, further comprising:
    averaging the offgoing clutch torque during the torque phase;
    averaging the offgoing clutch slip speed during the torque phase;
    recording the clutch gain in another lookup table indexed by the offgoing clutch slip and the offgoing clutch torque;
    calculating the clutch gain as a weighted average of the recorded clutch gains from each of the lookup tables;
    and controlling the subsequent power downshift of the transmission using the weighted average of the recorded clutch gains.

6. An automatic transmission comprising:
    a clutch that is used as an offgoing clutch during a power downshift; and
    a controller in communication with the clutch, wherein the controller includes proportional-integral-derivative (PID) control logic, and is configured to:
        detect initiation of the power downshift;
        reduce a pressure command to the offgoing clutch to threshold level according to a calibrated profile;

introduce a calibrated error value, via the PID control logic, to a pressure control command for the offgoing clutch during the inertia phase of the power downshift;

calculate a shift energy value of the power downshift only over the inertia phase of the power downshift;

synchronize a speed of the offgoing clutch with a speed of an oncoming clutch during the torque phase of the bower downshift;

wait a calibrated duration after synchronizing the offgoing and oncoming shift speeds;

determine an offgoing clutch pressure and an offgoing clutch torque after the calibrated duration has elapsed;

record a clutch gain as a function of the offgoing clutch pressure and the offgoing clutch torque; and control a subsequent power downshift of the transmission using the recorded clutch gain.

7. The vehicle of claim 6, wherein the controller is further configured to:

record the clutch gain in a [1×X] lookup table indexed by the calculated shift energy value.

8. The vehicle of claim 6, wherein the controller is configured to:

average the offgoing clutch torque during the torque phase;

average the offgoing clutch slip speed during the torque phase;

record the clutch gain in another lookup table indexed by the offgoing clutch slip and the offgoing clutch torque; and control the subsequent power downshift of the transmission using a weighted average of the recorded clutch gains.

9. The transmission of claim 6, wherein the transmission is one of a 6-speed transmission and an 8-speed transmission.

* * * * *